(12) United States Patent
Li et al.

(10) Patent No.: US 9,235,780 B2
(45) Date of Patent: Jan. 12, 2016

(54) ROBUST KEYPOINT FEATURE SELECTION FOR VISUAL SEARCH WITH SELF MATCHING SCORE

(71) Applicant: Samsung Electronics Co., LTD, Suwon-si, Gyeonggi-do (KR)

(72) Inventors: Zhu Li, Plano, TX (US); Xin Xin, Bellevue, WA (US); Abhishek Nagar, Garland, TX (US); Gaurav Srivastava, Dallas, TX (US); Kong Posh Bhat, Plano, TX (US); Felix Carlos Fernandes, Plano, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 11 days.

(21) Appl. No.: 14/101,047

(22) Filed: Dec. 9, 2013

(65) Prior Publication Data

US 2014/0185941 A1    Jul. 3, 2014

Related U.S. Application Data

(60) Provisional application No. 61/748,372, filed on Jan. 2, 2013.

(51) Int. Cl.
*G06K 9/68* (2006.01)
*G06K 9/62* (2006.01)
*G06K 9/46* (2006.01)

(52) U.S. Cl.
CPC ............ *G06K 9/6211* (2013.01); *G06K 9/4671* (2013.01)

(58) Field of Classification Search
CPC ...... G06K 9/46; G06K 9/4604; G06K 9/4671; G06K 9/6202; G06K 9/6204; G06K 9/6206; G06K 9/6211; G06K 9/6212; G06K 2009/6213; G06K 9/00147; G06K 9/00181; G06K 9/00187; G06K 9/00422; G06K 9/00536; G06K 9/62; G06K 9/00617; G06T 7/0024
See application file for complete search history.

(56) References Cited

U.S. PATENT DOCUMENTS

| 8,401,307 | B1 * | 3/2013 | Rowe et al. | 382/201 |
| 8,948,518 | B2 * | 2/2015 | Xin et al. | 382/201 |
| 2007/0179921 | A1 * | 8/2007 | Zitnick et al. | 706/20 |
| 2011/0299770 | A1 * | 12/2011 | Vaddadi et al. | 382/165 |
| 2013/0016912 | A1 * | 1/2013 | Li et al. | 382/197 |
| 2013/0142439 | A1 * | 6/2013 | Xin et al. | 382/201 |

* cited by examiner

*Primary Examiner* — Brian Le

(57) ABSTRACT

To improve feature selection accuracy during a visual search, interest points within a query image are two-way matched to features in an affine transformed image or otherwise transformed version of the query image. A user device implements a method for selecting local descriptors in the visual search. The method includes: detecting a first set of interest points for the original image; computing an affine transform matrix; computing a new image as a transformation of the original image using the affine transform matrix; detecting a second set of interest points from the and new image; performing a two-way matching between the first set of interest points and the second set of interest points; sorting matching pairs according to a specified self-matching score (SMS); assigning an infinite value to SMS of unmatched interest points from the original image; selecting the interest points based on SMS. Significant performance gains reduce false positive matches.

20 Claims, 9 Drawing Sheets

ROBUST KEYPOINT FEATURE SELECTION FOR VISUAL SEARCH WITH SELF MATCHING SCORE

CROSS-REFERENCE TO RELATED APPLICATIONS AND CLAIM OF PRIORITY

This application hereby incorporates by reference U.S. Provisional Patent Application No. 61/748,372, filed Jan. 2, 2013, entitled "ROBUST KEYPOINT FEATURE SELECTION FOR VISUAL SEARCH WITH SELF MATCHING SCORE."

TECHNICAL FIELD

The present disclosure relates generally to image matching during processing of visual search requests and, more specifically, to improving feature selection accuracy during processing of a visual search request.

BACKGROUND

Mobile query-by-capture applications (or "apps") are growing in popularity. Snap Tell is a music, book, video or video game shopping app that allows searching for price comparisons based on a captured image of the desired product. Vuforia is a platform for app development including vision-based image recognition. Google and Baidu likewise offer visual search capabilities.

Among the technical challenges posed by such functionality is efficient image indexing and visual search query processing. In particular, processing visual search requests transmitted over wireless communications systems necessitates consideration of bandwidth usage by the request process.

There is, therefore, a need in the art for efficient visual search request processing.

SUMMARY

To improve feature selection accuracy during processing of a visual search, interest points within a query image are two-way matched to features in an affine transformed image or otherwise transformed version of the query image. A user device implements a method for selecting local descriptors in the visual search. The method includes: detecting a first set of interest points for the original image; computing an affine transform matrix; computing a new image as a transformed version of the original image using the affine transform matrix; detecting a second set of interest points from the new image; performing a two-way matching between the first set of interest points and the second set of interest points; sorting matching pairs according to a specified self-matching score; assigning an infinite value to self-matching score of unmatched interest points from the original image; and selecting the interest points based on self-matching score. Significant performance gains obtained due to reduced false positive matches.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (i) Test Model 3: Compact Descriptor for Visual Search, ISO/IEC/JTC1/SC29/WG11/W12929, Stockholm, Sweden, July 2012 (hereinafter "REF1"); (ii) CDVS, Description of Core Experiments on Compact descriptors for Visual Search, N12551. San Jose, Calif., USA: ISO/IEC JTC1/SC29/WG11, February 2012 (hereinafter "REF2"); (iii) ISO/IEC JTC1/SC29/WG11/M22672, Telecom Italia's response to the MPEG CfP for Compact Descriptors for Visual Search, Geneva, CH, November 2011 (hereinafter "REF3"); (iv) CDVS, Evaluation Framework for Compact Descriptors for Visual Search, N12202. Turin, Italy: ISO/IEC JTC1/SC29/WG11, 2011 (hereinafter "REF4"); (v) CDVS Improvements to the Test Model Under Consideration with a Global Descriptor, M23938, San Jose, Calif., USA: ISO/IEC JTC1/SC29/WG11, February 2012 (hereinafter "REF5"); (vi) IETF RFC5053, Raptor Forward Error Correction Scheme for Object Delivery (hereinafter "REF6"); (vii) Lowe, D. (2004), Distinctive Image Features from Scale-Invariant Keypoints, International Journal of Computer Vision, 60, 91-110 (hereinafter "REF7"); and (viii) Andrea Vedaldi, Brian Fulkerson: "Vlfeat: An Open and Portable Library of Computer Vision Algorithms," ACM Multimedia 2010: 1469-1472 (hereinafter "REF8").

Mobile visual search using Content Based Image Recognition (CBIR) and Augmented Reality (AR) applications are gaining popularity, with important business values for a variety of players in the mobile computing and communication fields. One key technology enabling such applications is a compact image descriptor that is robust to image recapturing variations and efficient for indexing and query transmission over the air. As part of on-going Motion Picture Expert Group (MPEG) standardization efforts, definitions for Compact Descriptors for Visual Search (CDVS) are being promulgated (see [REF1] and [REF2]).

Figure 1:
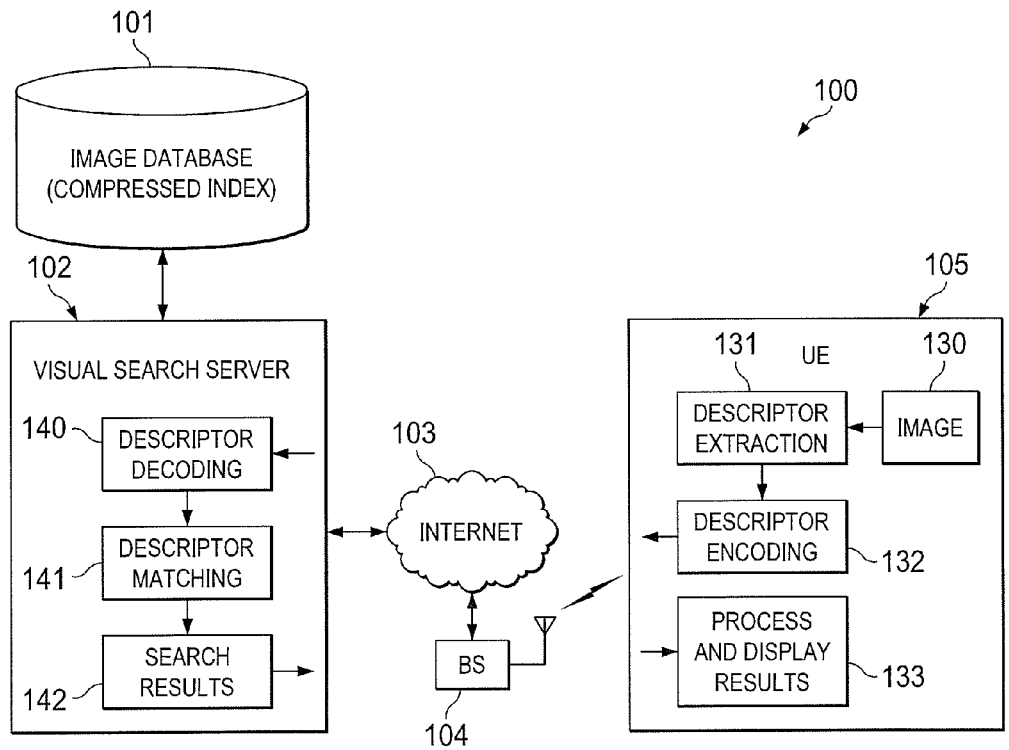
FIG. 1 illustrates high level diagram of a network within which visual query processing with a two-way matching self-matching score based Feature Selection (FS) scheme may be performed in accordance with various embodiments of the present disclosure.

FIG. 1 illustrates high level diagram of a network within which visual query processing with a two-way matching self-matching score based Feature Selection (FS) scheme may be performed in accordance with various embodiments of the present disclosure. The network 100 includes a database 101 of stored global descriptors regarding various images (which, as used herein, includes both still images and video), and may include the images themselves. The images may relate to geographic features such as a building, bridge or mountain viewed from a particular perspective, human images including faces, or images of objects or articles such as a brand logo, a vegetable or fruit, or the like. The database 101 is communicably coupled to (or alternatively integrated with) a visual search server data processing system 102, which processes visual searches in the manner described below. The visual search server 102 is coupled to a user device 105 (also referred to as user equipment (UE) or a mobile station (MS)) for receipt of visual searches/queries from and delivery of visual search results. The visual search server 102 is coupled to a user device 105 by a communications network, such as the Internet 103 and a wireless communications system including a base station (BS) 104. As noted above, the user device 105 can be a "smart" phone or tablet device capable of functions other than wireless voice communications, including at least playing video content. Alternatively, the user device 105 can be a laptop computer or other wireless device having a camera or display and/or capable of requesting a visual search.

Figure 1A:
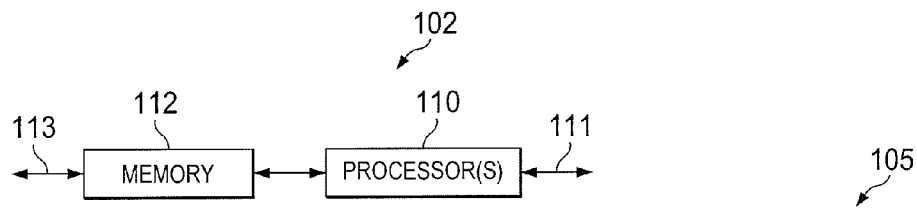
FIG. 1A illustrates a high level block diagram of the functional components of the visual search server from the network of FIG. 1.
Figure 1B:
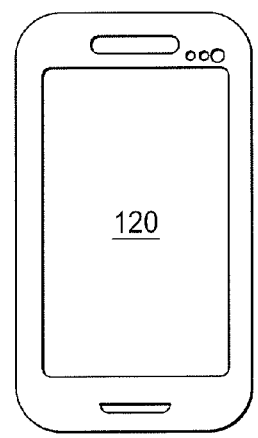
FIG. 1B illustrates a front view of a wireless device from the network of FIG. 1.
Figure 1C:
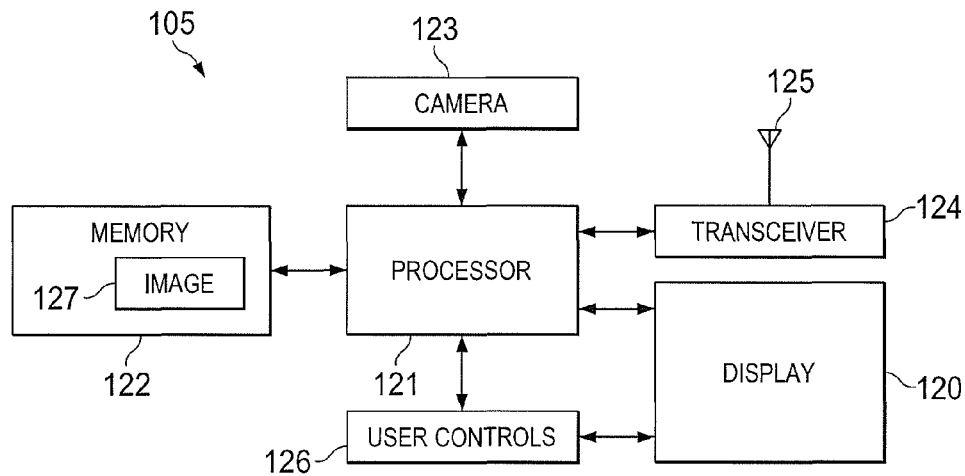
FIG. 1C illustrates a high level block diagram of the functional components of the wireless device of FIG. 1B.

FIG. 1A illustrates a high level block diagram of the functional components of the visual search server from the network 100 of FIG. 1, while FIG. 1B illustrates a front view of wireless device from the network 100 of FIG. 1 and FIG. 1C illustrates a high level block diagram of the functional components of that wireless device 105.

Visual search server 102 includes one or more processors 110 coupled to a network connection 111 over which signals corresponding to visual search requests may be received and signals corresponding to visual search results may be selectively transmitted. The visual search server 102 also includes memory 112 storing an instruction sequence for processing visual search requests, and data used in the processing of visual search requests. The memory 112 in the example shown includes a communications interface for connection to image database 101.

User device 105 is a mobile phone and includes an optical sensor (not visible in the view of FIG. 1B) for capturing images and a display 120 on which captured images may be displayed. A processor 121 coupled to the display 120 controls content displayed on the display. The processor 121 and other components within the user device 105 are either powered by a battery (not shown), which may be recharged by an external power source (also not shown), or alternatively by the external power source. A memory 122 coupled to the processor 121 can store or buffer image content for playback or display by the processor 121 and display on the display 120, and can also store an image display and/or video player application (or "app") 127 for performing such playback or display. The image content being played or displayed can be captured using camera 123 (which includes the above-described optical sensor) or received, either contemporaneously (e.g., overlapping in time) with the playback or display or prior to the playback/display, via transceiver 124 connected to antenna 125—e.g., as a Short Message Service (SMS) "picture message." User controls 126 (e.g., buttons or touch screen controls displayed on the display 120) are employed by the user to control the operation of mobile device 105 in accordance with known techniques.

Figure 2:
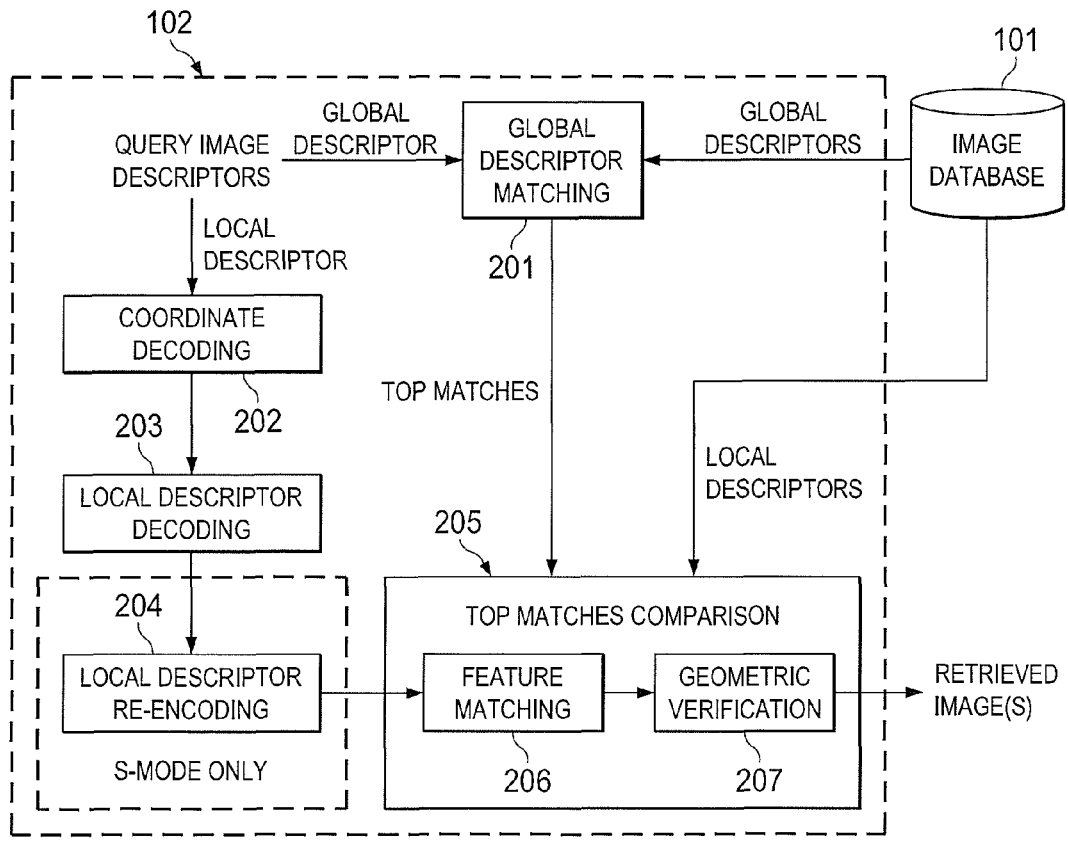
FIG. 2 illustrates, at a high level, the overall compact descriptor visual search (CDVS) pipeline exploited within a visual search server in accordance with embodiments of the present disclosure.

FIG. 2 illustrates, at a high level, the overall compact descriptor visual search (CDVS) pipeline exploited within a visual search server in accordance with embodiments of the present disclosure. Rather than transmitting an entire image to the visual search server 102 for deriving a similarity measure between known images, the mobile device 105 transmits only descriptors of the image, which may include one or both of global descriptors such as the color histogram and texture and shape features extracted from the whole image and/or local descriptors, which are extracted using (for example) Scale Invariant Feature Transform (SIFT) or Speeded Up Robust Features (SURF) from feature points detected within the image and are preferably invariant to illumination, scale, rotation, affine and perspective transforms.

Key to mobile visual search and augmented reality (AR) applications is use of compact descriptors that are robust to image recapturing variations (e.g., from slightly different perspectives) and efficient for indexing and query transmission over the air, an area that is part of on-going Motion Picture Experts Group (MPEG) standardization efforts. In a CDVS system, visual queries include two parts: global descriptors and local descriptors for distinctive image regions (or points of interest) within the image and the associated coordinates for those regions within the image. A local descriptor includes of a selection of (for example) SIFT points [REF7] based upon certain pre-defined criteria, compressed through a multi-stage vector quantization (VQ) scheme. A global descriptor is derived from quantizing the Fisher Vector computed from up to 300 SIFT points, which basically captures the distribution of SIFT points in SIFT space.

Figure 3:
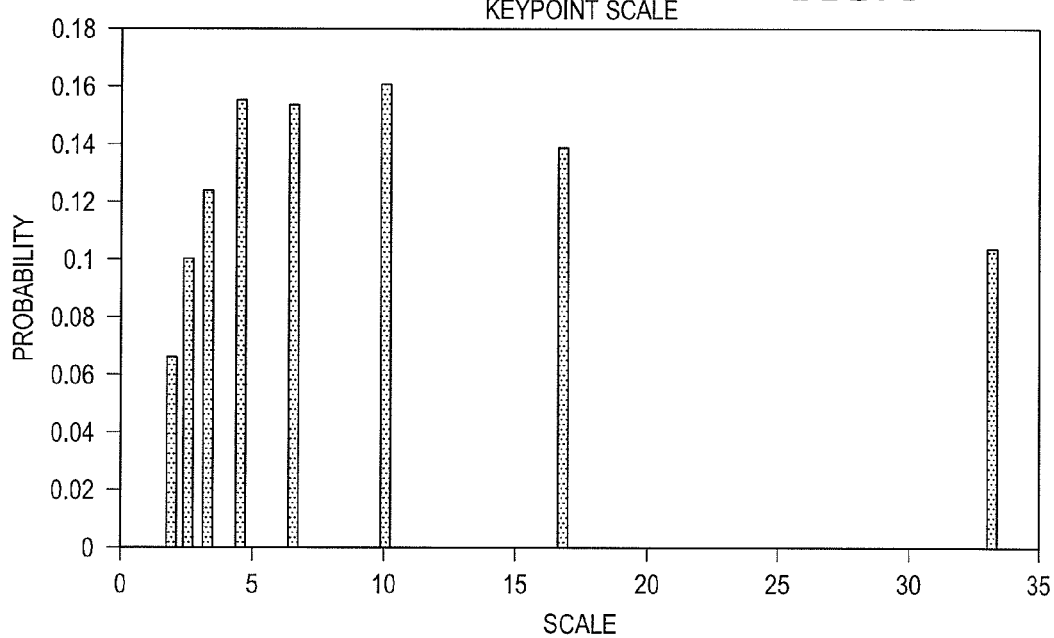
FIG. 3 illustrates a probability of correct match for the different scale values of the SIFT feature, in accordance with embodiments of the present disclosure.
Figure 4:
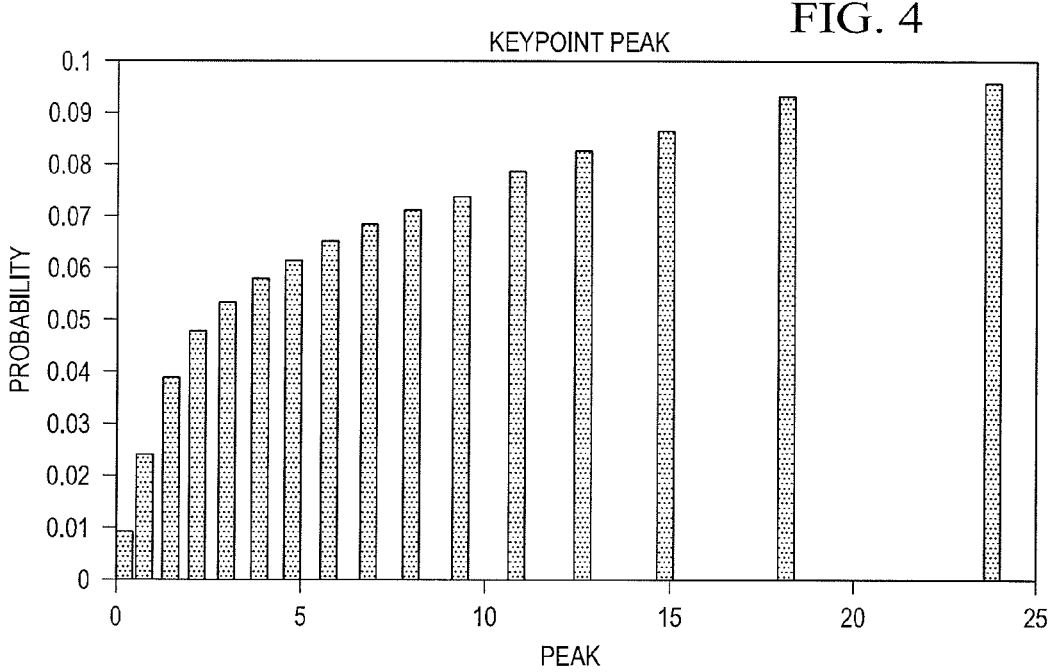
FIG. 4 illustrates a probability of correct match for the different peak strength values of the SIFT feature, in accordance with embodiments of the present disclosure.

The performance of the CDVS system is very much dependent on the quality of SIFT points selected for generating a Local Descriptor and a Global Descriptor. The limited bandwidth or limited bit budget for the visual query allows a fixed number of SIFTs that can be sent over the channel. The match and retrieval performance improves by increasing the number of SIFTs that can match with the images of the repository side. Other solutions, such as CVDS solutions, are based on the statistical modeling of key point features' scale, orientation, peak strength, and locations (distance to the center) within the image (namely, scale, orientation, peak strength, and distance to the center ([s, o, p, d])), which are observed at the extraction time. The probability of a SIFT point that can be matched up at query time is therefore modeled as a probability mass function (PMF) over the discrete values of SIFT features. The modeling of the PMF over the discrete values of SIFT features occurs off-line at training time. FIGS. 3 and 4 illustrate plots of PMF of two most dominating features: scale and peak strength, respectively.

FIG. 3 illustrates a probability mass function (PMF) of discrete values of the SIFT feature scale for a particular image. FIG. 4 illustrates a probability mass function (PMF) of discrete values of the SIFT feature peak strength for a particular image. As apparent from FIGS. 3 and 4, the probability distributions are not regular.

At query time, given the observation of SIFT features of scale, orientation, peak strength, distance to the center, the likelihood that the feature will be matched up is computed as the product of PMFs of observed scale, orientation, peak strength and distance to the center, as shown by Equation 1 below:

$$L(s, o, p, d) = P_{scale}(s) P_{orientation}(o) P_{peak\_strength}(p) P_{distance}(d). \quad (1)$$

Then an order can be generated by sorting the likelihood $L(s,o,p,d)$ to facilitate the SIFT selection for the global descriptor (GD) and local descriptor (LD) construction.

Other solutions of feature selection (FS) have the following disadvantages:
(a) Feature Robustness: in image re-capturing, certain "good" SIFT features may not be detectable with in plane rotations and out of plane rotations and image quality degradation. The robustness of the feature to image recapturing variations are not captured well;
(b) Reliability of the Likelihood modeling: the independence assumption in computing the likelihood is questionable. A better practical alternative has not been proposed; and
(c) Prediction accuracy: comparing the other solutions of feature selection with the random selection scheme, the performance gain is only 22% better—meaning that random selection scheme is not a solution that can significantly outperform the other solutions of feature selection.

To address those disadvantages described above and to improve feature selection (FS) performance in visual search, a self-matched score based FS scheme is described. The self-matched score based FS scheme increases the number of useful SIFT features sent over the channel.

Figure 5:
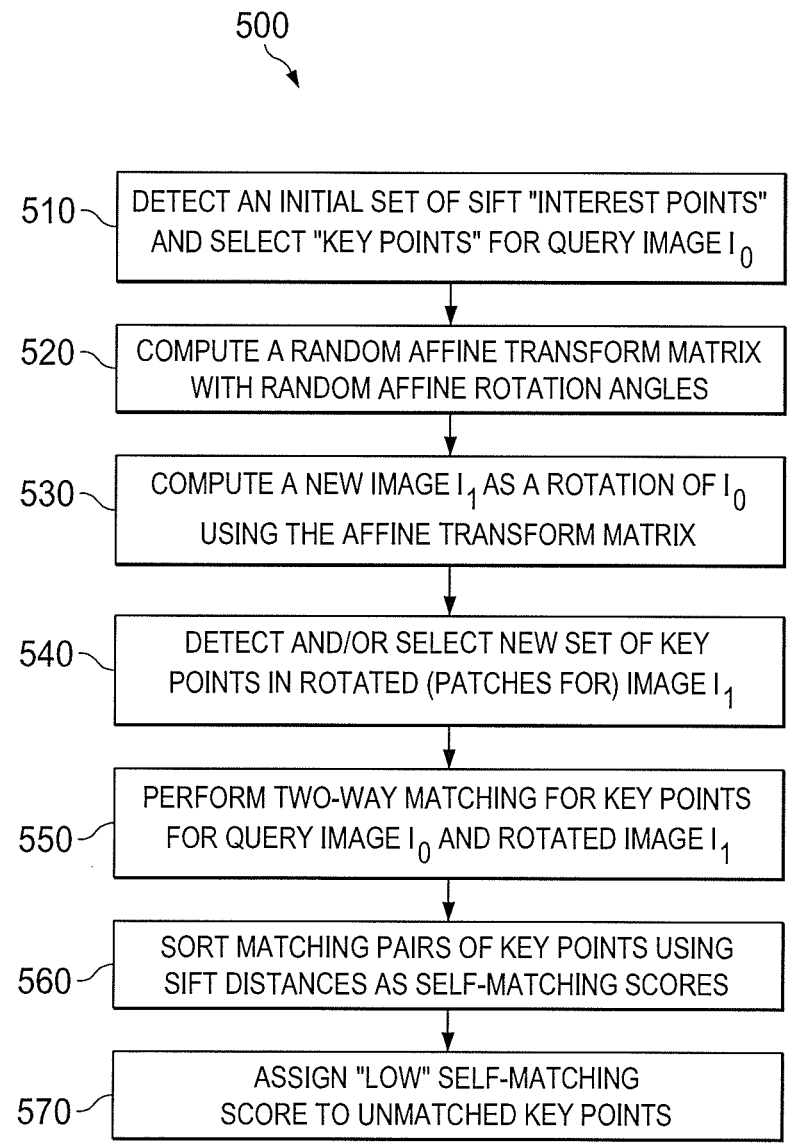
FIG. 5 illustrates a process of a self-matching score (SMS) based Feature Selection (FS) scheme in accordance with embodiments of the present disclosure.

FIG. 5 illustrates a process 500 of the self-matching score (SMS) based FS scheme in accordance with embodiments of the present disclosure. The user device 105 implements the process 500. The process 500 selects robust local descriptors in a visual search and significantly improves the local feature quality, which increases repeatability in visual matching. That is, when the process 500 is repeated for another image of the same object, the local descriptors selected during implementation of the process 500 generate the same visual matches. The local descriptors with low quality are not selected. The embodiment of the process 500 of the self-matching score based FS scheme shown in FIG. 5 is for illustration only. Other embodiments could be used without departing from the scope of this disclosure.

FIGS. 6A through 7B illustrate examples images processed using the self-matching score (SMS) based algorithm of the process 500 for an FS scheme, and are discussed below in connection with the exemplary process of FIG. 5.

In the exemplary process depicted, the user device 105 detects (step 510) an initial set of SIFT points $S = \{S_1, S_2, \ldots, S_n\}$ for an image $I_0$. For example, the user device 105 may detect approximately 1000 SIFT points or more in the original image $I_0$, which can be referred to as "interest points." Bandwidth limitations may constrain number of SIFT points that should be transmitted from the user device 105 and can prevent the user device 105 from transmitting all 1000 of the detected SIFT points. According to a bandwidth allowance, therefor, the user device 105 selects (for instance) only 300 of those detected SIFT points to be transferred to the visual search server 102 (step 510). The selected SIFT points to be transferred are referred to herein as "key points" (KP), and may be the strongest of the 1000 or more detected SIFT points.

Figure 6A:
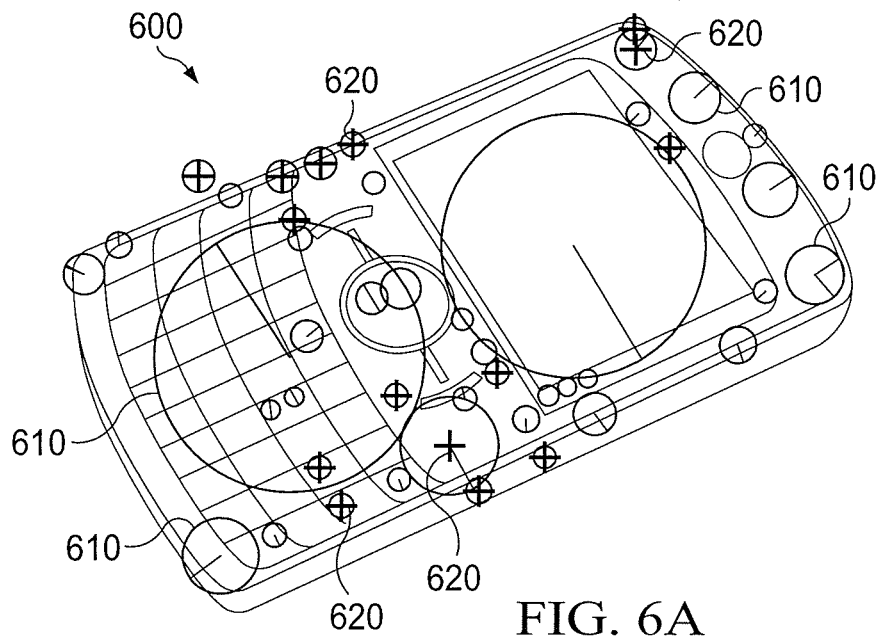
FIG. 6A illustrates an example of an original image in accordance with embodiments of the present disclosure.

FIG. 6A illustrates an example of an original image $I_0$ 600. In the example shown, the image is of a cellular phone that has a QWERTY keypad and round select button disposed between the QWERTY keypad buttons and the bottom the display screen of the cellular phone, centered in the width of the phone's display screen. The set (S) of detected SIFT points selected as key points are highlighted in the figure by circles 610. Each circle 610 is centered about the key point that the circle demarcates or represents, and has a radius corresponding to the strength of the key point. That is, stronger key points have a circle with a larger radius; weaker key points have a circle with a smaller radius.

The user device 105 computes (step 520) a random affine transform matrix A parameterized by random variables $\alpha$ and $\beta$. Equation 2 is an example of a random affine transform matrix with random affine rotation angles:

$$A = \begin{matrix} 1 & \alpha & 0 \\ \beta & 1 & 0 \\ 0 & 0 & 1 \end{matrix}. \quad (2)$$

The skew parameters $\alpha$ and $\beta$ may have different values or the same value, which value(s) are random and preferably in the range of 0 to $1/\sqrt{2}$.

Figure 6B:
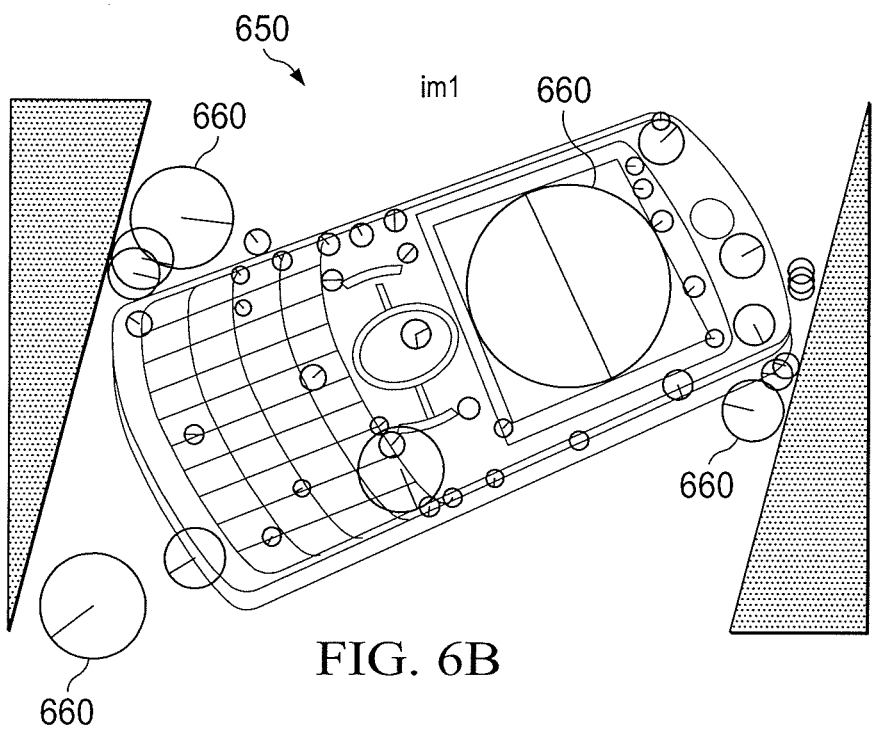
FIG. 6B illustrates an example of an affine transformed image of the image of FIG. 6A in accordance with embodiments of the present disclosure.

The user device 105 computes (step 530) a new image $I_1$ as a transformation of image $I_0$ using affine matrix A. FIG. 6B illustrates an example of an affine transformed image $I_1$ 650. In the example shown, the affine transformation image $I_1$ 650 is of the cellular phone of FIG. 6A that appears rotated slightly clockwise. The affine transformed image $I_1$ is utilized to prevent weak local features from being used as key points in the two-way matching process, or, stated differently, to remove weak local features from the selection of two-way matched points. The process of eliminating weak features involves "self-matching," or matching of the original query image $I_0$ to the transformed image $I_1$ using key points detected and in both images and then compared.

In certain embodiments, the user device 105 reduces the complexity of processing to generate the new image $I_1$ by computing the transformation of only the local image patches associated with the SIFT points, instead of transforming the whole image. That is, each portion of the original image $I_0$ that are within a circle 610 can be referred to as an image patch. The transformation of an image patch uses the center of the image patch as the center of transformation based on parameters α or β. Each image patch can be transformed by different parameters.

The user device 105 detects and selects (step 540) a new set of SIFT key points $F=\{F_1, F_2, \ldots, F_n\}$ from the new image $I_1$. The set of detected and selected SIFT key points for transformed image $I_1$ are again identified by the circles 660 in FIG. 6B, again centered on the respective key point and with a radius proportional to the strength of the key point. As an example, the user device 105 may detect and/or select only 90 key points in the affine transformed image $I_1$ 650.

The user device 105 then performs a two-way self-matching (step 550) between S (the set of key points of image $I_0$) and F (the set of SIFT points of image $I_1$). Optionally, a one-way self-matching process could be employed. That is, key points from the original image $I_0$ could be compared to key points in transformed image $I_1$ for matching, without any comparison of key points selected from transformed image $I_1$ to the key points selected for the original image $I_0$. Preferably, however, two-way matching is utilized. In one part of the two-way self-matching procedure, the user device 105 determines which key points in the original image $I_0$ are also identified as such in the transformed image $I_1$. In the other part of the two-way self-matching procedure, the user device 105 determines which key points in the transformed image $I_1$ are identified as such in the original image $I_0$. That is, the user device 105 performs a forward direction and reverse direction matching between the key points of S and F. The key points selected as matching according to both the forward and reverse ways of self-matching are selected as two-way matched. A set of two-way matched key points are more reliable in determining a "true match" (avoiding false positives). FIG. 6A shows plus signs 620 that represent the key points 610 detected in the original image $I_0$ 600 that have good self-matching scores. In other words, the two-way matched points 620 and associated self-matching scores for SIFT in image $I_0$ are represented by plus signs.

Figure 7A:
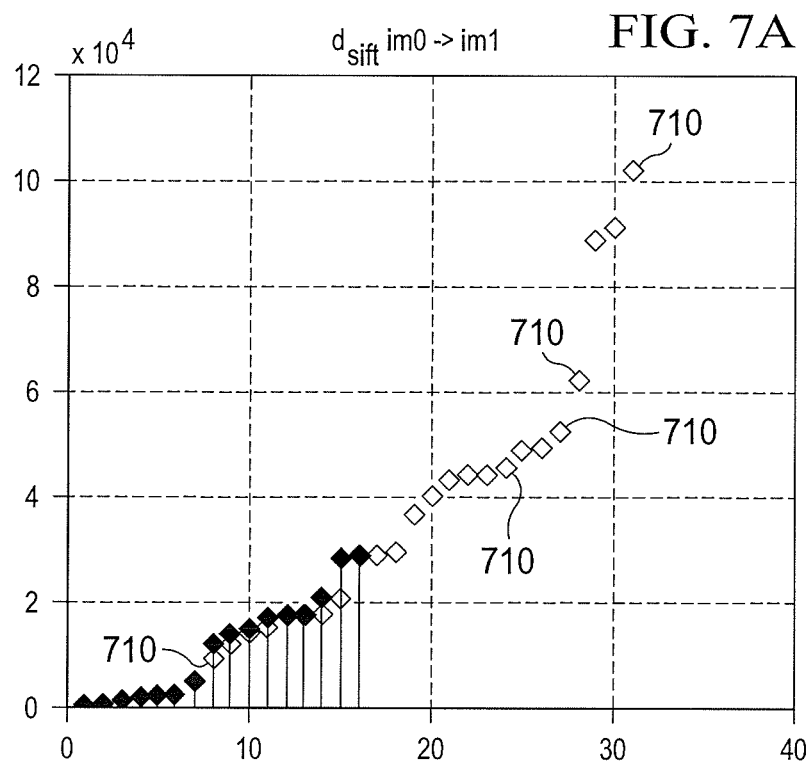
FIG. 7A illustrates matching distances of the original image of FIG. 6A to the affine transformed image of FIG. 6B in accordance with embodiments of the present disclosure.
Figure 7B:
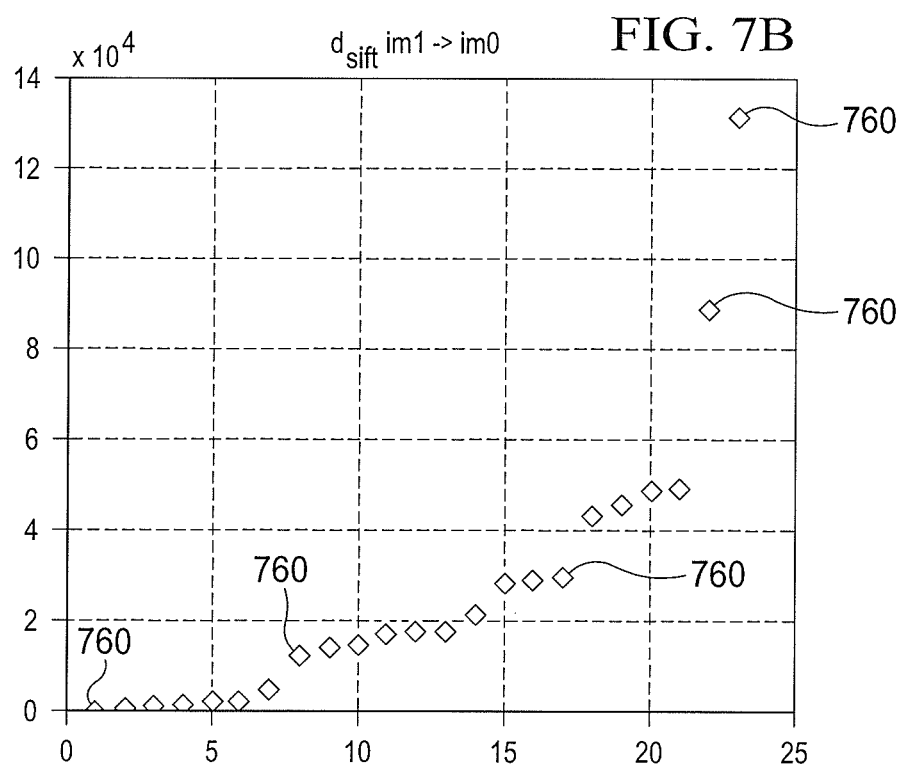
FIG. 7B illustrates matching distances of the affine transformed image of FIG. 6B matched to the original image of FIG. 6A in accordance with embodiments of the present disclosure.

In block 560, the user device 105 sorts the SIFT points based on the self-matching score (SMS) where the SMS of a SIFT point is derived from the two-way matched distance of the given point with its corresponding matched point in the transformed image. As a result of the sorting, the user device 105 generates a ranking of SIFT points in S that serve the feature selection. That is, more favorably ranked interest points are preferentially selected to be transmitted to the visual search server over less favorably ranked interest points. According to bandwidth allowances, the lowest ranked interest points may not be selected for transmission at all. In certain embodiments, closest matching distances are most favorably ranked. FIG. 7A illustrates matching distances 710 of the original image $I_0$ to the affine transformed image $I_1$. FIG. 7B illustrates matching distances 760 of the affine transformed image $I_1$ matched to the original image $I_0$. The dots in both FIG. 7A and FIG. 7B represent matching distances, while the bars in FIG. 7A identify two-way matched points for key points from the original image $I_0$. The plots in blue dots are the one way matching distance for matching $I_0$ to $I_1$ and $I_1$ to $I_0$, respectively. The red lines are the matching pairs that are consistent in both cases.

In scoring the two-way matching, "low" matching values are assigned (step 570) to key points from one of the two images that do not correlate to a counterpart key point in the other. That is, for matching where low distance values indicate a better match, an infinite value may be assigned as the self-matching score to key points in S or F that did not match during either of the two-way matching process performed in step 550.

Figure 8A:
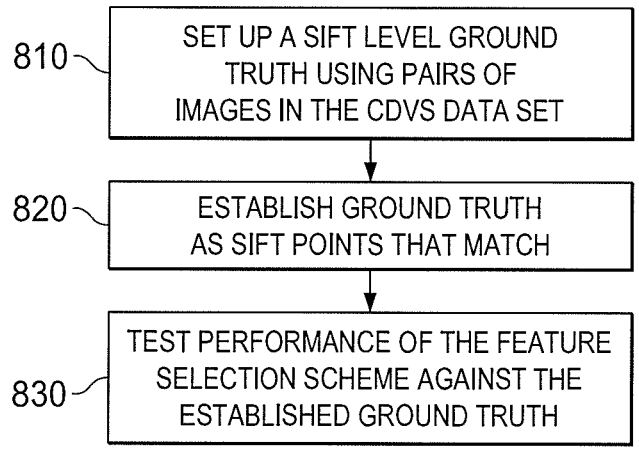
FIG. 8A illustrates a process of testing the effectiveness of a process of a Feature Selection scheme in accordance with embodiments of the present disclosure.

A benefit of this SMS based approach is that impact on SIFT features by the image formation induced variations are captured in the process, so a self-matching score based feature selection accurately reflects the true behavior of the SIFT features in the image matching. The effectiveness of the process 500 of the self-matching score (SMS) based FS scheme can be tested. FIG. 8A illustrates a method 800 of testing the effectiveness of a process of a FS scheme in accordance with embodiments of the present disclosure. For example, the method 800 of testing effectiveness can be implemented to test the effectiveness of the SMS based FS scheme 500. The testing method 800 includes setting up a SIFT level ground truth using more than 16,000 pairs of images in the CDVS data set (step 810), and establishing the ground truth as the SIFT points that match (step 820) between each pair of images.

Figure 8B:
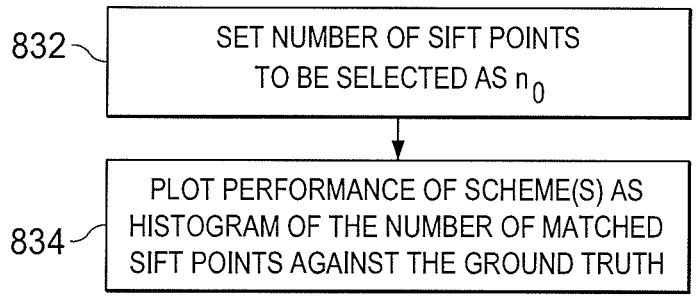
FIG. 8B illustrates a process of testing the performance of a Feature Selection scheme in accordance with embodiments of the present disclosure.

Once the matching points for the image pairs have been established, the performance of various Feature Selection schemes may be tested by observing how many selected SIFT points are actually matched up in the matching image pairs (step 830). For example, as shown in FIG. 8B, an observation of how many selected SIFT points are actually matched up using a particular feature selection scheme can be implemented by setting the number of SIFT points to be selected as a number of points $n_0$ (for example, $n_0=300$) (step 832), and then plotting the performance of various schemes as a histogram of the number of SIFT points matched up against the ground truth (step 834).

FIG. 9A through 9D illustrate examples of histograms plotted during testing of the effectiveness of a process of a FS scheme in accordance with embodiments of the present disclosure. For comparison, test results 905 of the random selection solution, which achieves an average of 44 correct matches, is plotted as lines over the bars of each of histograms of FIGS. 9A-9D.

Figure 9A:
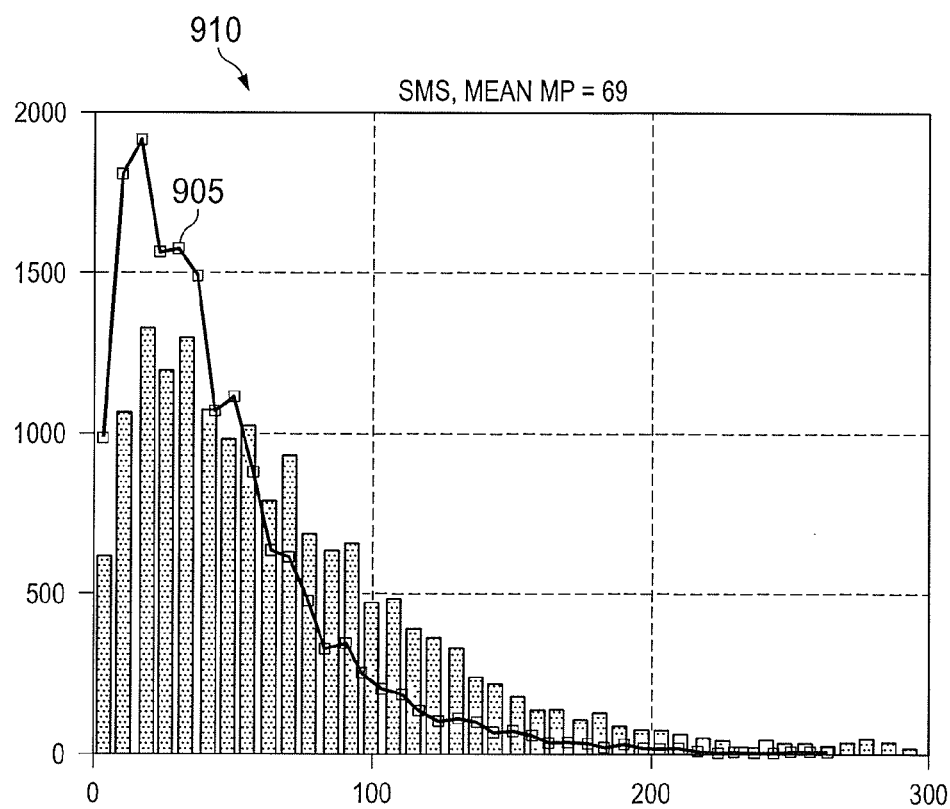
FIG. 9A through 9D illustrate examples of histograms of different feature selection criteria, from other solutions and from the self-matching score based feature selection solution, plotted during implementation of the method of testing the effectiveness of a process of a Feature Selection scheme in accordance with embodiments of the present disclosure.

FIG. 9A illustrates a histogram 910 of the performance of the process 500 of the self-matching score (SMS) based FS scheme, which achieves an average of 69 correct matches. That is, the key points are selected based on the SMS score of the key points. The performances gains of the SMS scheme (also referred to as the SMS based FS scheme) surpass the performance of the random selection solution by $(69.18-43.54)/43.54=58.80$.

Figure 9B:
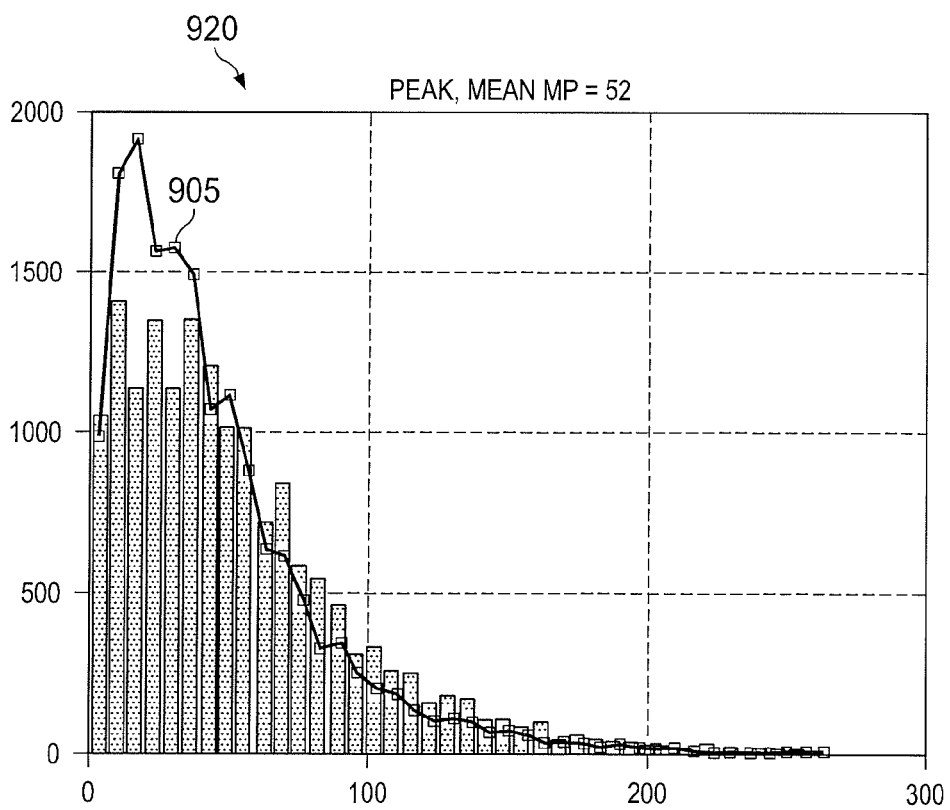

FIG. 9B illustrates a histogram 920 of the performance of peak strength sorted scheme, which achieves an average of 52 correct matches. The key points are selected based on the peak strength of each key point.

Figure 9C:
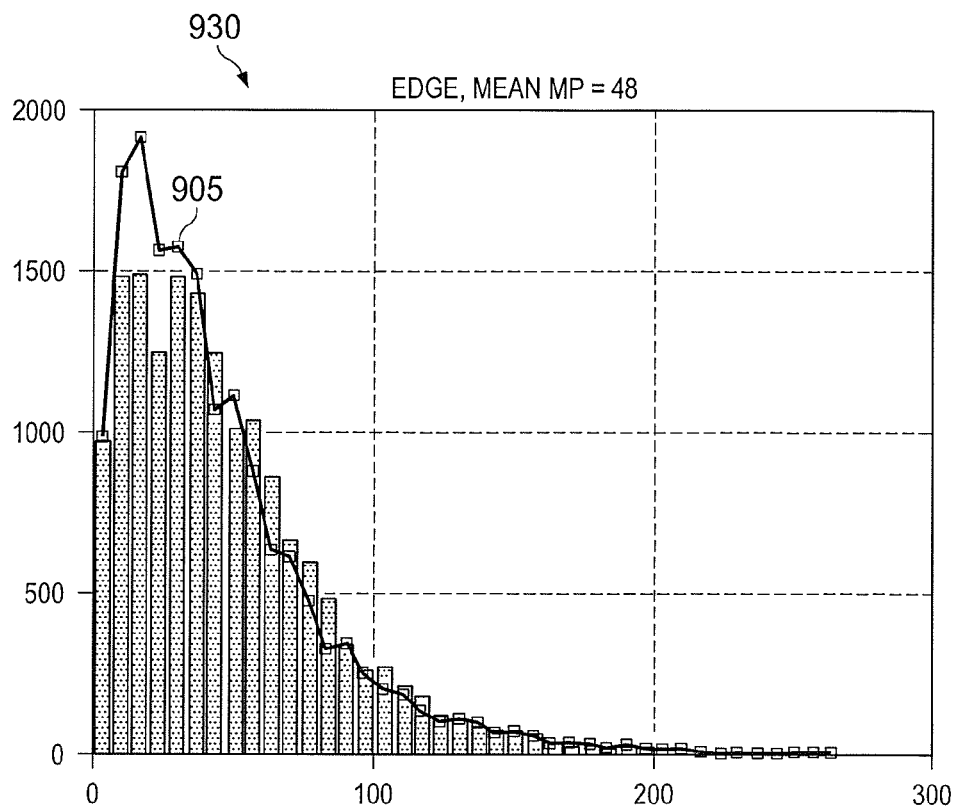

FIG. 9C illustrates a histogram 930 of the performance of an edge strength sorted solution, which achieves an average of 48 correct matches. The key points are selected based on the edge strength of the key points.

Figure 9D:
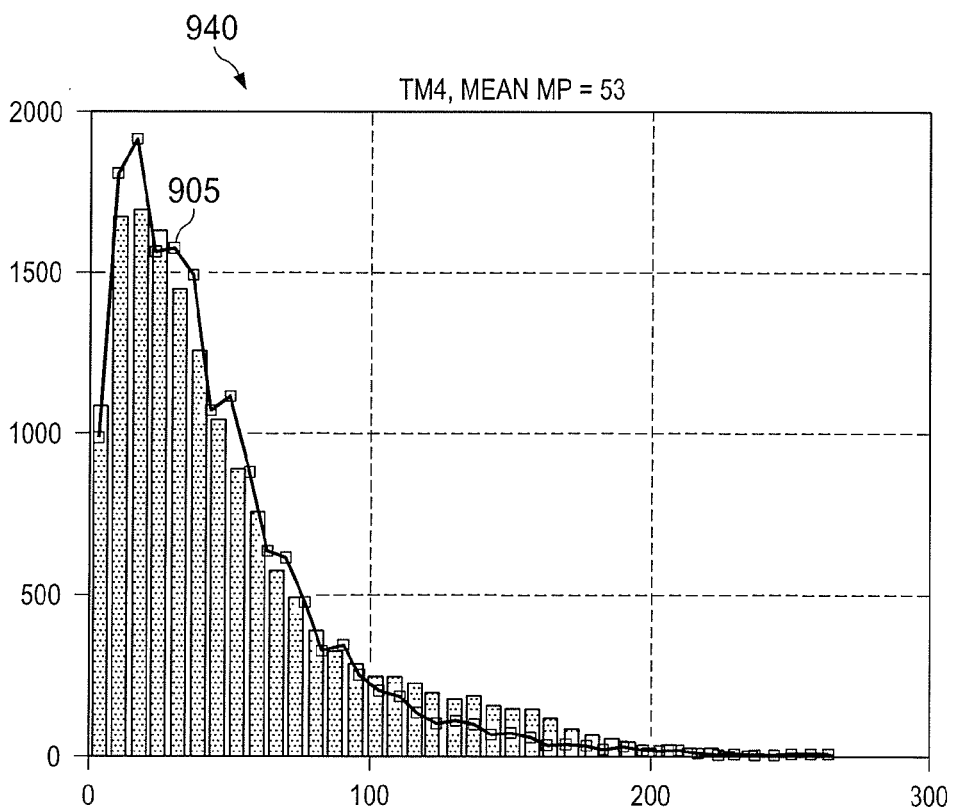

FIG. 9D illustrates a histogram 940 of the performance of a CDVS solution, which jointly models a number of features (namely, [s, o, p, d]), and which achieves an average of 53 correct matches. The performances gains of the SMS scheme according to the present disclosure exceed the performance of the CDVS solution by (69.18−52.72)/52.72=31%. The performances gains of CDVS achieved a performance gain over random selection by (52.72−43.54)/43.54=21%. Accordingly, the SMS scheme according to the present disclosure provides a significant improvement in performance gains.

The computational complexity of current implementation (not optimized) can be represented by the average of 0.8 seconds used to compute in MATLAB. This computational complexity and time period to compute, can be reduced by only transforming the local image patches covered by SIFT points, and only performing SIFT detection with known location and scale in I1. Test model integration shows that the complexity is well within the bound.

Certain embodiments of the present disclosure include a combined feature statistical modeling that includes: SMS, scale, peak and edge strengths.

The present disclosure has been described with reference to key points selected using the SIFT algorithm, but this disclosure is not limited by the SIFT algorithm. Other algorithms can be used to identify key points, without departing from the scope of this disclosure. Examples of other algorithms include SURF, and Binary Robust Invariant Scalable Keypoints (BRISK).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method, comprising:
   detecting by a device, a first set of key points for an original image to be used as a query image for a visual search request;
   generating a transformed image as an affine-transformation of the original image;
   detecting a second set of key points from the transformed image;
   determining matches between key points for the original image and key points for the transformed image; and
   selecting, from the matches, matching key points for the original and transformed images to transmit to a visual search server in the visual search request.

2. The method of claim 1, further comprising:
   in the device, assigning scores to the matching key points based upon Scale Invariant Feature Transform (SIFT) algorithm distances between a respective key point in the original image and a respective key point in the transformed image.

3. The method of claim 1, wherein detecting key points comprises using at least one of: a Scale Invariant Feature Transform (SIFT) algorithm, a Speeded Up Robust Features (SURF) algorithm, and a Binary Robust Invariant Scalable Keypoints (BRISK) algorithm.

4. The method of claim 1, wherein generating a transformed image comprises using an affine transform matrix including at least two randomly selected skew parameters between 0 through $1/\sqrt{2}$.

5. The method of claim 1, wherein selecting matching key points comprises selecting up to a predetermined number of key points to transmit.

6. The method of claim 1, wherein determining matches between key points for the original image and key points for the transformed image comprises two-way matching.

7. The method of claim 1, wherein determining matches between key points for the original image and key points for the transformed image further comprises:
   selecting key points for the original image meeting at least a predetermined criteria for comparison to key points for the transformed image.

8. The method of claim 7, wherein the predetermined criteria comprises a strength of the respective key point.

9. The method of claim 7, wherein generating the transformed image comprises transforming image patches corresponding to the selected key points.

10. The method of claim 1, further comprising:
    transmitting a predetermined number of key points for the original image in the visual search request to the visual search server.

11. An apparatus for submitting a visual search request to a visual search server, the apparatus comprising:
    a processor configured
       to detect a first set of key points for an original image to be used as a query image for the visual search request,
       to generate a transformed image as an affine-transformation of the original image,
       to detect a second set of key points from the transformed image,
       to determine matches between key points for the original image and key points for the transformed image, and
       to select matching key points for the original and transformed images to transmit to the visual search server in the visual search request.

12. The apparatus of claim 11, wherein the processor is configured to assign scores to the matching key points based upon Scale Invariant Feature Transform (SIFT) algorithm distances between a respective key point in the original image and a respective key point in the transformed image.

13. The apparatus of claim 11, wherein detecting key points comprises using at least one of: a Scale Invariant Feature Transform (SIFT) algorithm, a Speeded Up Robust Features (SURF) algorithm, and a Binary Robust Invariant Scalable Keypoints (BRISK) algorithm.

14. The apparatus of claim 11, wherein generating a transformed image comprises using an affine transform matrix including at least two randomly selected skew parameters between 0 and $1/\sqrt{2}$.

15. The apparatus of claim 11, wherein selecting matching key points comprises selecting up to a predetermined number of key points to transmit.

16. The apparatus of claim 11, wherein determining matches between key points for the original image and key points for the transformed image comprises two-way matching.

17. The apparatus of claim 11, wherein the processor is further configured to determine matches between key points for the original image and key points for the transformed image by selecting key points for the original image meeting at least a predetermined criteria for comparison to key points for the transformed image.

18. The apparatus of claim 17, wherein the predetermined criteria comprises a strength of the respective key point.

19. The apparatus of claim 17, wherein generating the transformed image comprises affine-transforming image patches corresponding to the selected key points.

20. The apparatus of claim 11, further comprising:
a transmitter configured to transmit a predetermined number of key points for the original image in the visual search request to the visual search server.

* * * * *